United States Patent [19]

Sawamoto

[11] Patent Number: 5,143,037
[45] Date of Patent: Sep. 1, 1992

[54] VARIABLE CAM ENGINE

[75] Inventor: Kunifumi Sawamoto, Yokohama, Japan

[73] Assignee: Nissan Motor Co., Ltd., Yokohama, Japan

[21] Appl. No.: 797,950

[22] Filed: Nov. 26, 1991

[30] Foreign Application Priority Data

Nov. 26, 1990 [JP] Japan .................. 2-321678

[51] Int. Cl.[5] .............................. F02D 9/00
[52] U.S. Cl. .................. 123/399; 123/90.16
[58] Field of Search .......... 123/90.15, 90.16, 399, 123/361

[56] References Cited

U.S. PATENT DOCUMENTS

| 4,581,924 | 4/1986 | Otobe et al. | 123/399 |
| 4,887,561 | 12/1989 | Kishi | 123/90.16 |
| 4,899,701 | 2/1990 | Inoue et al. | 123/90.16 |
| 4,926,823 | 5/1990 | Kishi et al. | 123/90.16 |

FOREIGN PATENT DOCUMENTS

63-167016  7/1988  Japan .

Primary Examiner—E. Rollins Cross
Assistant Examiner—Weilun Lo
Attorney, Agent, or Firm—Foley & Lardner

[57] ABSTRACT

This invention concerns a variable cam engine wherein cam change-over is performed according to the running condition of the engine. The engine is provided with a throttle valve whose opening basically corresponds to the accelerator depression, but which nevertheless can be freely varied irrespective of the accelerator depression. When a change-over is performed between the economy cam and power cams, a target throttle opening is computed such that the torque generated after the change-over is the same as the torque before the change-over. At the time, to prevent the occurrence of torque shock, the throttle valve is made to temporally overshoot the target opening, and then return to the target opening. The amount of this overshoot and the return time constant is computed based on at least the difference of throttle openings before and after change-over and the engine speed.

5 Claims, 12 Drawing Sheets

VARIABLE CAM ENGINE

BACKGROUND OF THE INVENTION

This invention relates to an engine wherein the characteristics of the cams driving the air intake and exhaust valves can be selected according to the running condition of the engine, and more particularly, to a control system for controlling the engine power when a cam change-over is made.

FIELD OF THE INVENTION

The optimum timing of the air intake and exhaust valves of an engine differ according to the running conditions of the engine. At high speed, for example, a large valve lift and a long valve opening period (valve overlap) are required in order to obtain high torque, while on partial load, when fuel cost performance is more important than torque, a small valve lift and short long opening period are required to reduce pumping loss.

If the running conditions of the engine varied widely, as in the case of a car engine for example, it was thus impossible to attain the operating characteristics required by the intake and exhaust valves over the entire range of conditions.

In Tokkai Sho 63-167016 (Koho) published by the Japanese Patent Office, a variable cam engine is proposed wherein several cams with different shapes are provided, and the operating characteristics of the air intake and exhaust valves are made to coincide with the required characteristics over a broad range of running conditions.

In such a variable cam engine, an economy cam which gives good fuel cost performance on partial load and a power cam which generates large torque on full load are provided, and cam change-overs are made to correspond with the accelerator depression. When the accelerator depression is small, the economy cam is selected, and when the accelerator depression is large, the power cam is selected.

However, the fuel-air mixture aspirated into a cylinder in one air intake process varies depending on the type of cam driving the air intake valve. When a cam change-over is made, therefore, an output power change is produced due to the difference of air intake charging efficiency in the cylinder even if the throttle opening remains the same.

If for example the economy cam is changed over to a power cam, the air charging efficiency increases and the output power therefore increases considerably immediately after making a change-over. A large torque shock is thus produced and driving performance of the vehicle is seriously affected even if the throttle opening is essentially the same before and after a cam change-over.

SUMMARY OF THE INVENTION

It is therefore an object of the invention to prevent torque variations during a cam change-over, and to maintain smooth running performance, in a variable cam engine.

To attain the above object, this invention provides a variable cam engine including an economy cam having a profile which gives good fuel cost performance, a power cam having a profile which gives a large torque, means to select these cams according to the engine running conditions, and a mechanism to change over these cams such that the selected cam drives a valve of the engine. This engine comprises means for detecting the accelerator depression of the engine, a throttle valve provided in the air intake passage, an actuator to open and close the throttle valve, means for computing a throttle valve opening according to the accelerator depression, means for detecting the throttle valve opening, means for computing a throttle valve target opening after a cam change-over such that the torque computed based on the throttle valve opening before the cam change-over is the same as the torque generated after the change-over, means for computing an overshoot amount of the throttle valve from at least the difference of engine speed and throttle valve opening before and after the change-over, means for causing the throttle valve opening to overshoot by the computed amount compared to the target opening when a cam change-over is made, means for computing a throttle valve return time constant based on at least the throttle valve opening and engine speed before and after the change-over, and a means for returning the throttle valve opening to the throttle valve target opening after the overshoot at a rate depending on the time constant.

To attain the above object, this invention also provides a variable cam engine including an economy cam having a profile which gives good fuel cost performance, a power cam having a profile which gives a large torque, means to select these cams according to the engine running conditions, and a mechanism to change over these cams such that the selected cam drives a valve of the engine. This engine comprises means for detecting the accelerator depression of the engine, a throttle valve provided in the engine air intake passage, means for controlling a throttle valve opening such that a torque is generated according to the accelerator depression, means for detecting the throttle valve opening, means for computing a throttle valve target opening after a cam change-over such that the torque computed based on the throttle valve opening before the cam change-over is the same as the torque generated after the change-over, means for computing a negative intake pressure response delay from at least the engine speed and the difference of throttle valve opening before and after the change-over, means for computing an overshoot amount of the throttle valve from this negative intake pressure response delay and the engine speed, means for causing the throttle valve opening to overshoot by the computed amount compared to the target opening when a cam change-over is made, means for computing a throttle valve return time constant based on at least the engine speed and the throttle valve opening immediately after the change-over, and corresponding to the throttle valve downstream collector volume, and means for returning the throttle valve opening to the throttle valve target opening after the overshoot at a rate depending on the time constant.

DESCRIPTION OF THE PREFERRED EMBODIMENTS

Figure 1:
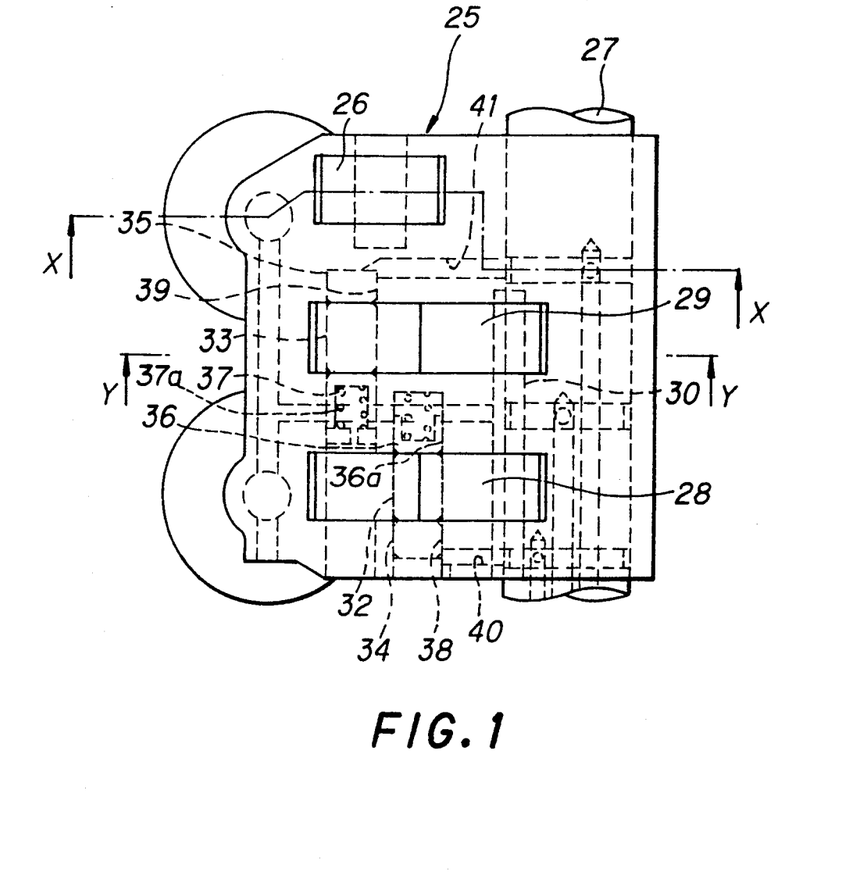
FIG. 1 is a plan view of a cam selecting mechanism of a variable cam engine according to this invention.
Figure 2:
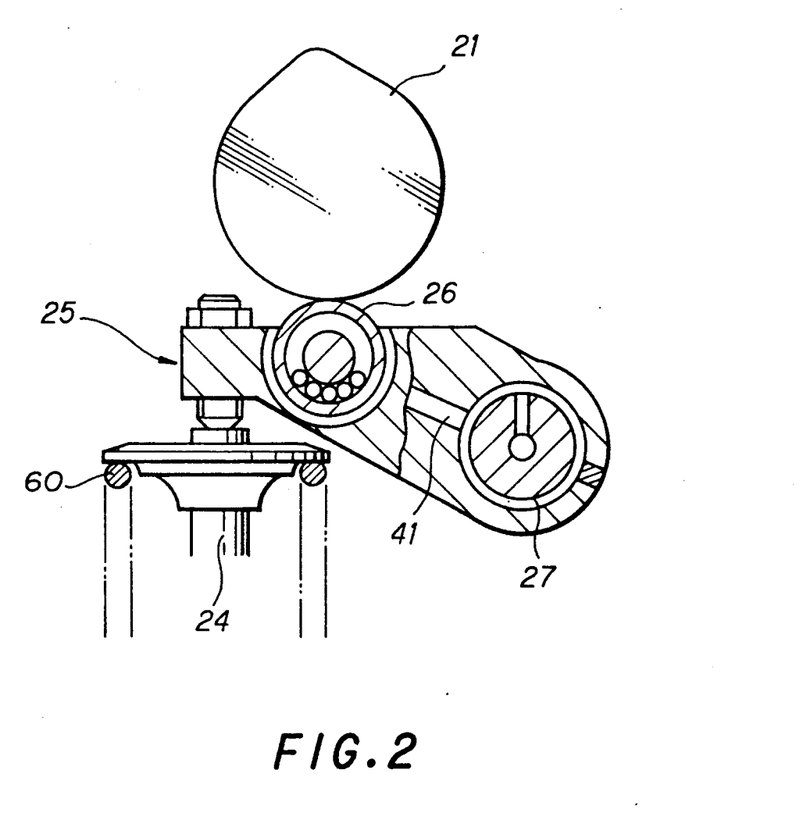
FIG. 2 shows a section through the line X—X in FIG. 1.
Figure 3:
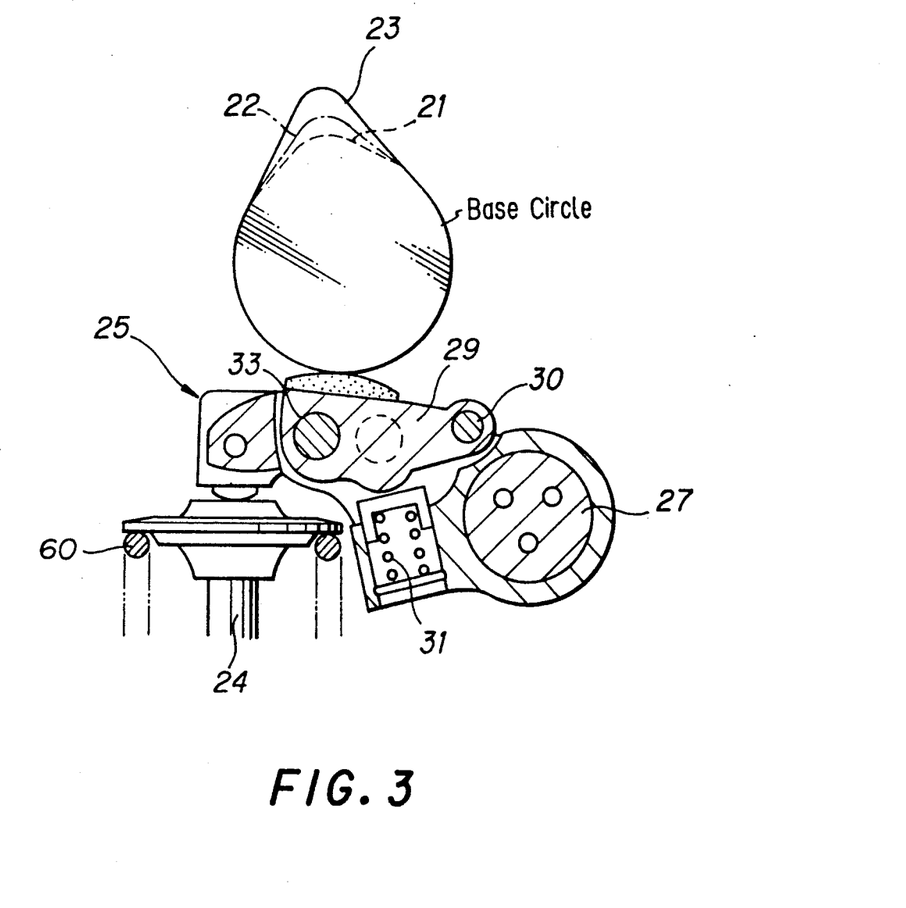
FIG. 3 shows a section through the line Y—Y in FIG. 1.

FIGS. 1, 2 and 3 show the structure of the cam selecting mechanism.

A first cam 21 (economy cam) has a shape which gives both a small cam lift amount and short lift period, and is set such that it gives good fuel cost performance on partial load.

A second cam 22 (low speed power cam) has a shape which gives a larger cam lift amount and longer lift period than the first cam 21, and is set such that it generates a large torque at low speeds.

A third cam 23 (high speed power cam) has a shape which gives a still higher lift amount and longer lift period than the second cam 22, and is set such that it generates a large torque at high speeds.

Figure 4:
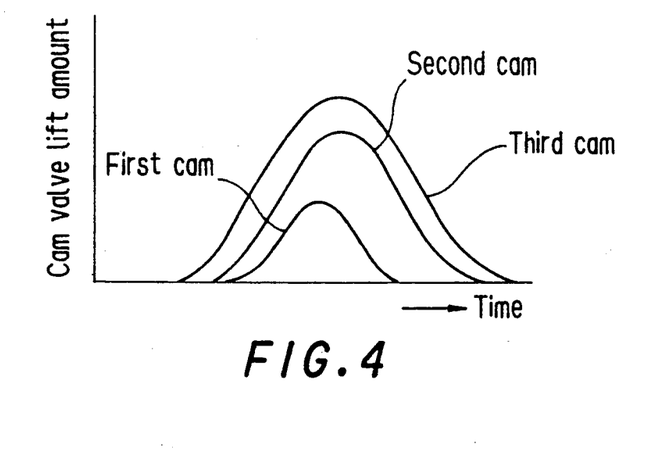
FIG. 4 is a graph showing the cam lift characteristics of the variable cam engine according to this invention.

The lift characteristics of these cams 21-23 are shown in FIG. 4. The base circle positions of cams 21-23 which are shown in FIG. 3 represent the non-lift intervals of these cams.

These cams 21, 22, 23 are arranged in series on the same cam shaft, not shown, and rotate together in synchronism with the engine revolution.

An air intake valve 24 is elastically supported in a closed position by a spring 61, and opened and closed by a main rocker arm 25 which pivots about a rocker shaft 27 supported by the engine cylinder head.

A roller 26 is attached to the main rocker arm 25 such that it can rotate freely. As shown in FIG. 2, the first cam 21 is in contact with this roller 26 and pushes the main rocker arm 25 down according to its rotation position to open the valve 24 against the force of the spring 61.

Two parallel grooves are formed on one side of the roller 26 in the main rocker arm 25. In these grooves, two sub-rocker arms 28 and 29 are provided which pivot about a common shaft 30 that is supported by the main rocker arm 25.

The sub-rocker arm 29 is supported such that it is in contact with the third cam 23 by a spring 31 inserted between the sub-rocker arm 29 and the main rocker arm 25 as shown in FIG. 3. Similarly, the sub-rocker arm 28 is supported such that it is in contact with the second cam 22 under the force of another spring. The sub-rocker arms 29 and 28 therefore pivot about the shaft 30 according to the rotation of the cams 23 and 22 respectively.

A cylindrical pin 33 is inserted in a channel running horizontally through the sub-rocker arm 29 such that it is free to slide on the inside of the channel. A hydraulic chamber 39 of the same cross-section as this channel opens onto the inside of the groove in the main rocker arm 25 which accommodates the sub-rocker arm 29, and another pin 35 of the same cross-section as the pin 33 is free to slide on the inner surface of the chamber 39. The pins 33 and 35 are positioned coaxially in the base circle position of the third cam 23 corresponding to its non-lift position shown in FIG. 3.

A hole of the same cross-section as the aforesaid channel and the hydraulic chamber 39 of the sub-rocker arm 29 is provided in the opposite wall to the hydraulic chamber 39 of the groove housing the sub-rocker arm 29. A plunger 37 is inserted in this hole under the force of a return spring 37a.

When there is no pressurized oil acting on the hydraulic chamber 39, the pins 33 and 35 are pushed by the plunger 37 which is under the force of the return spring 37a so that they are held respectively in the channel of the sub-rocker arm 29 and the hydraulic chamber 39. In this state, the sub-rocker arm 29 can pivot freely with respect to the main rocker arm 25 according to the rotation of the third cam 23.

When pressurized oil is led through a passage 41 into the hydraulic chamber 39 in the base circle position of the third cam 23, the pins 35 and 33 which are positioned coaxially are pushed out by a predetermined distance against the force of the return spring 37a. Part of the pin 35 then enters the channel in the sub-rocker arm 29 and part of the pin 33 enters the hole in the main rocker arm housing the plunger 37 causing the sub-rocker arm 29 to engage with the main rocker arm 25.

Similarly, the sub-rocker arm 28 is caused to engage selectively with the main rocker arm 25 by means of an engaging mechanism which comprises pins 32 and 34, a return spring 36a, a plunger 36, a hydraulic chamber 38 and a passage 40.

When the sub-rocker arm 29 is engaged with the main rocker arm 25, the valve 24 opens and closes according to the motion of the third cam 23.

When the sub-rocker arm 29 is not engaged with the main rocker arm 25 and the sub-rocker arm 28 is engaged with the main rocker arm 25, the valve 24 opens and closes according to the motion of the second cam 22. When neither of the sub-rocker arms 28 and 29 are engaged with the main rocker arm 25, the valve 24 opens and closes according to the motion of the first cam 21.

In all cases, when the cams 21–23 are in the base circle position as shown in FIGS. 2 and 3, the main rocker arm 25, and the sub-rocker arms 28 and 29 are all in the non-lift position so that the air intake valve 24 is closed. Change-overs between the cams 21–23 are made during this non-lift interval.

Figure 5:
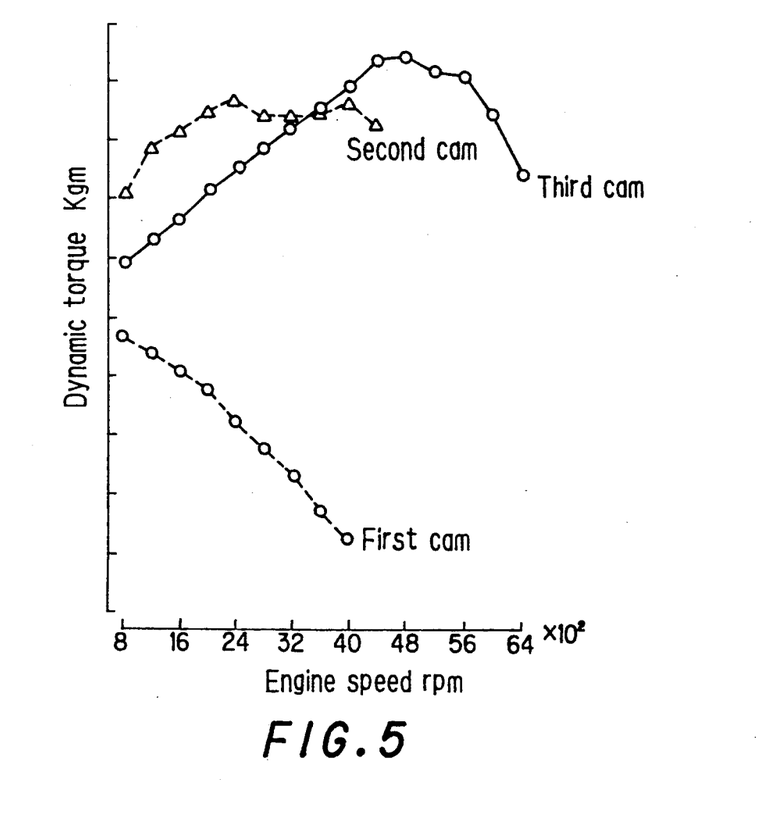
FIG. 5 is a graph showing output characteristics on full throttle of the variable cam engine according to this invention.

FIG. 5 shows the torque characteristics of the cams 21–23 at full throttle. The first cam 21 generates a small torque over the whole range of speeds but it gives good fuel cost performance. The second cam 22 generates its maximum torque in the low speed region, while the third cam 23 generates its maximum torque in the high speed region.

Figure 6:
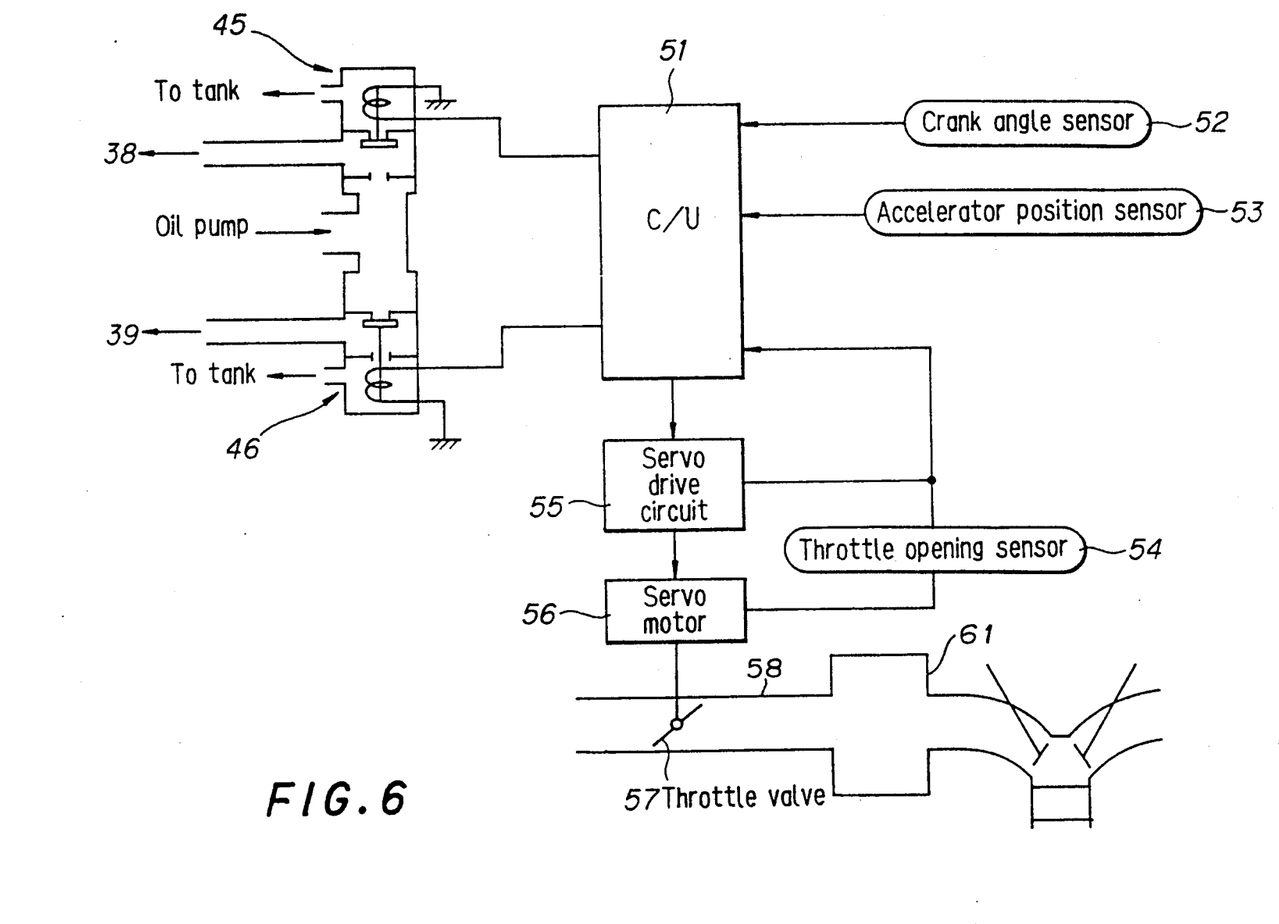
FIG. 6 is a schematic diagram of the construction of the power control mechanism according to this invention.

The change-overs between the 21, 22 and 23 are performed by a control unit 51 as shown in FIG. 6.

Figure 9:
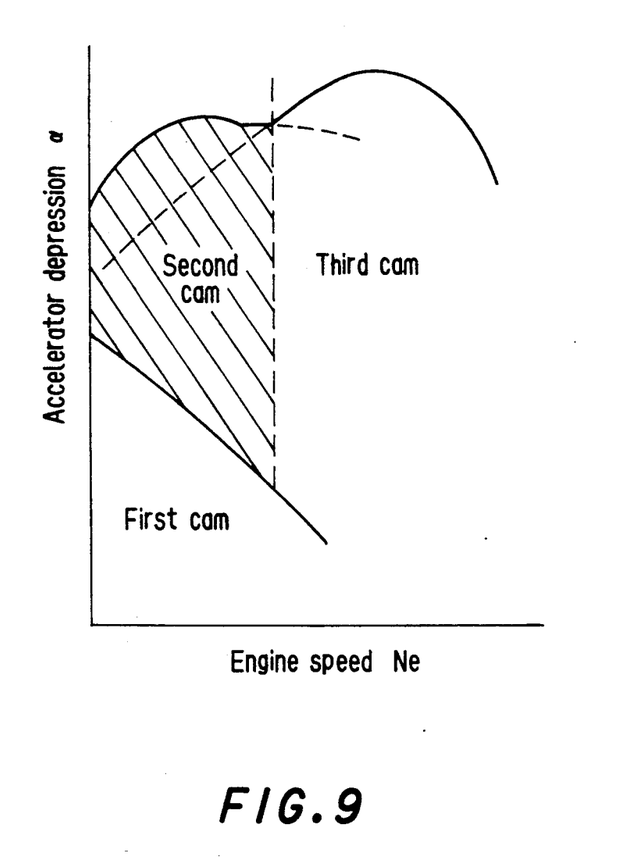
FIG. 9 is a graph of the cam change-over regions according to this invention based on the accelerator depression and the engine speed.

The control unit 51 is provided with a control map shown in FIG. 9 which sets the regions in which change-overs between the cams 21–23 are to be made, and it controls cam change-overs according to the accelerator depression and the engine speed as described hereinafter.

The control unit 51 is supplied with signals indicative of crankshaft angle of the engine from a crank angle sensor 52 and accelerator depression amount from an accelerator position sensor 53.

Figure 7:
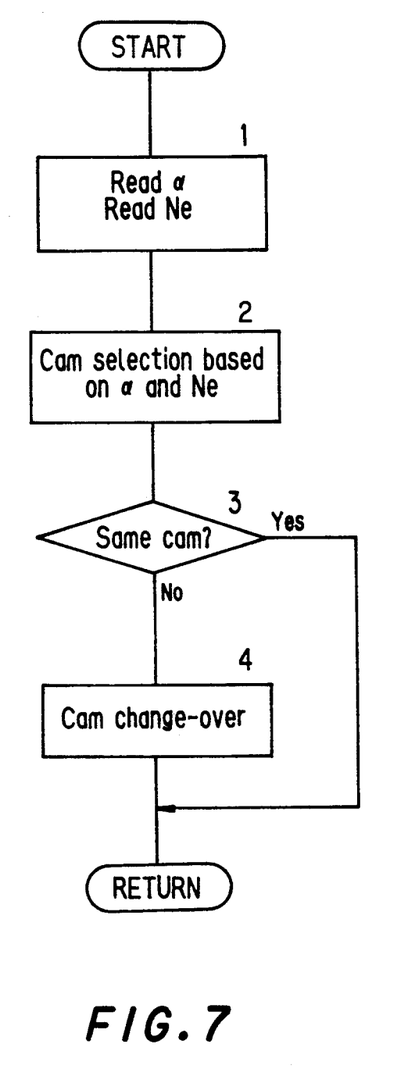
FIG. 7 is a flowchart showing the action of the cam change-over mechanism according to this invention.

Selection of the cams 21–23 by the control unit 51 takes place according to the flowchart of FIG. 7. An accelerator depression amount from the accelerator position sensor 53 and an engine speed Ne from the crank angle sensor 52 are read, and a target cam is selected based on the control map of FIG. 9. If the cam selected is different from the immediately preceding cam, a change-over is made to the new cam (steps 1–4).

More specifically, when the cam selected lies in the region of the first cam 21, i.e. the economy cam, this cam 21 is selected.

If the accelerator depression is then increased to a region where the required torque is large but the engine speed is relatively low, i.e. to the region of the second cam 22 which is the low speed power cam, this second cam 22 is selected. If the engine speed increases further to the region of the high speed power cam, this third cam 23 is selected.

To change over to the cam which has been selected, the control unit 51 outputs a cam change-over signal to solenoid valves 45 and 46 in order to supply pressurized oil to the aforesaid two hydraulic chambers 38 and 39, and a cam change-over is thereby performed by the opening and closing of the solenoid valves 45 and 46.

When the solenoid valve 45 is opened, pressurized oil is led from the oil pump, not shown, to the hydraulic chamber 38 so as to cause the sub-rocker arm 28 to engage with the main rocker arm 25. When on the other hand the solenoid valve 46 is opened, pressurized oil is led from the oil pump to the hydraulic chamber 39 so as to cause the sub-rocker arm 29 to engage with the main rocker arm 25. These actions cause the selected cam to become engaged.

The control valve also controls the opening of the throttle valve 57 installed in the air intake passage 58. The throttle valve 57 is opened and closed by a servo-motor 56 based on a throttle opening signal generated by the control unit 51 and amplified by a servodrive circuit 55.

Based on the signal from the accelerator depression sensor 53, the control unit 51 determines the torque required, and computes the throttle opening necessary to generate the required torque from the cam in use.

If the cam is different, the throttle opening required to generate the required torque will be different even if the accelerator depression is the same. For this reason, when a cam change-over is performed, the throttle opening is corrected at the same time. In particular, to prevent a torque shock, i.e. a sharp change in the torque generated when a cam change-over is performed, the throttle opening is corrected as according to the flow-chart of FIG. 8.

Figure 8:
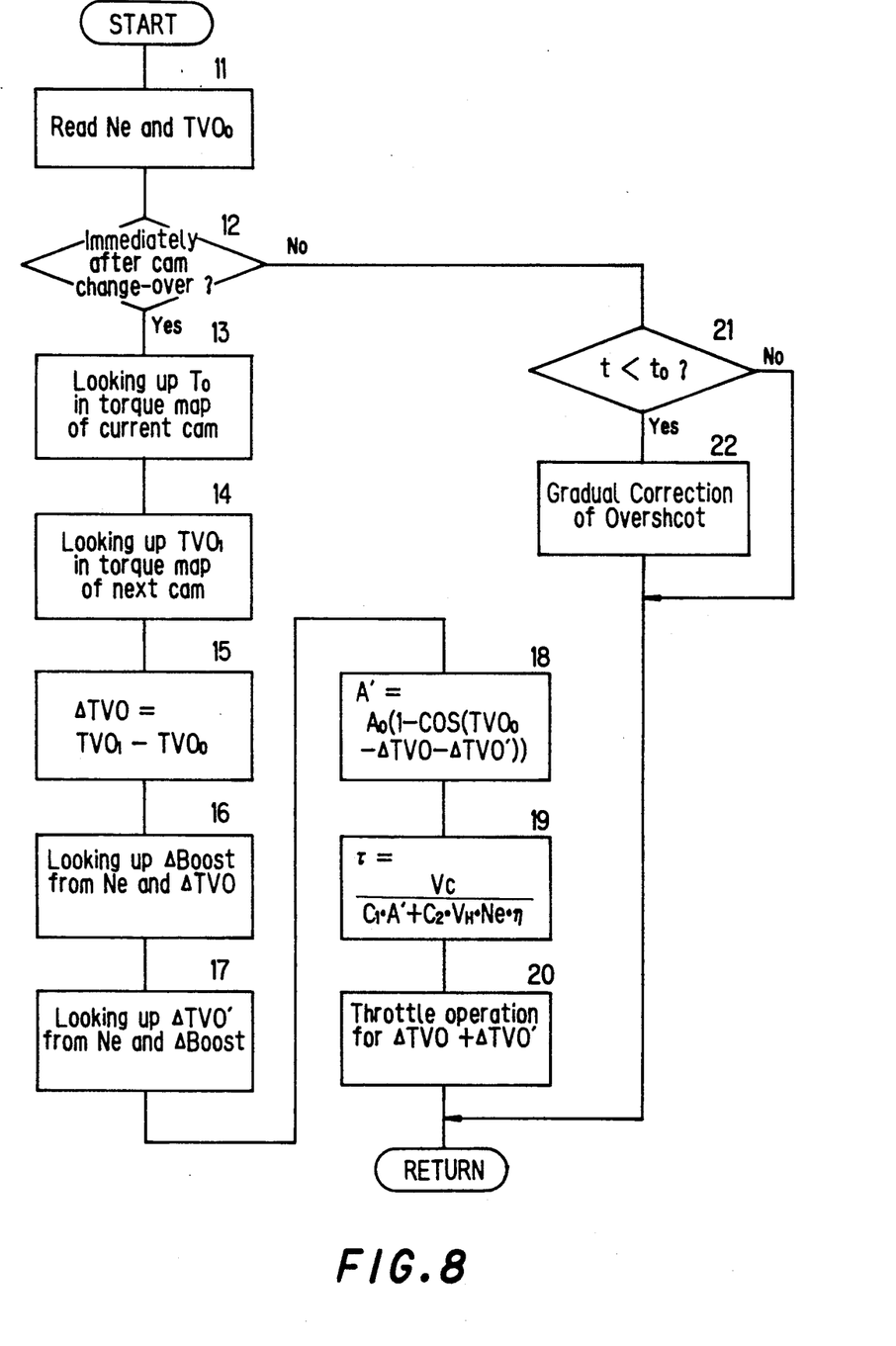
FIG. 8 is a flowchart showing the control of throttle opening when a cam change-over is made by the power control mechanism according to this invention.

From the engine speed Ne and the throttle opening TVO, it is determined whether or not a cam change-over has been performed (steps 11, 12), and if it has, the program proceeds to a step 13.

As an example, we will now describe the case wherein a change-over is made from the first cam 21 to the second cam 22. From the engine speed and the throttle opening, the torque TO generated when the engine is running with the first cam 21 is computed by referring to the map shown in FIG. 10. Next, a target throttle opening $TVO_1$ required to generate the same torque TO when the engine is running with the second cam 22 (the target cam) is found by referring to a map for the second cam shown in FIG. 11 (steps 13, 14).

Figure 14:
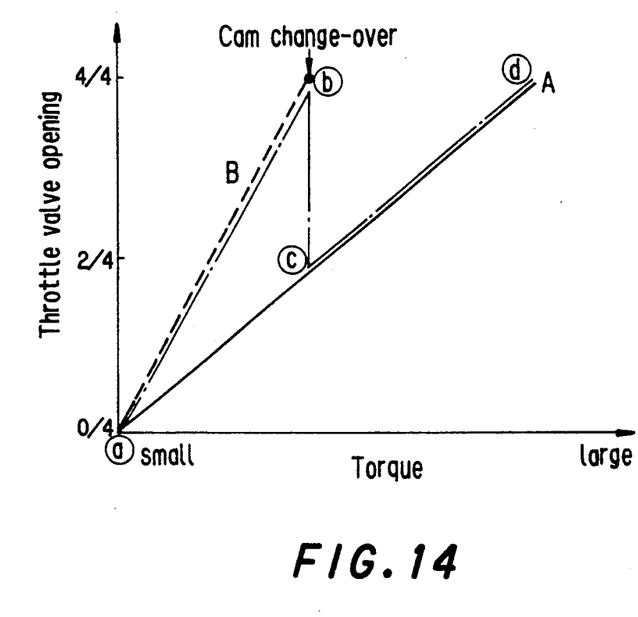
FIG. 14 is a graph showing the relation between throttle opening and torque generated according to the type of cam used in this invention.

As can also be seen from FIG. 14, the throttle opening is reduced from b to c in the figure to generate the same torque when the first cam 21 is changed over to the second cam 22. From the characteristics of the solid line in the upper part of FIG. 15, by decreasing the throttle opening by an amount $TVO_0 - TVO_1 = \Delta TVO$ in this way, a sharp change of the torque generated before and after a cam change-over can effectively be prevented.

Figure 15:
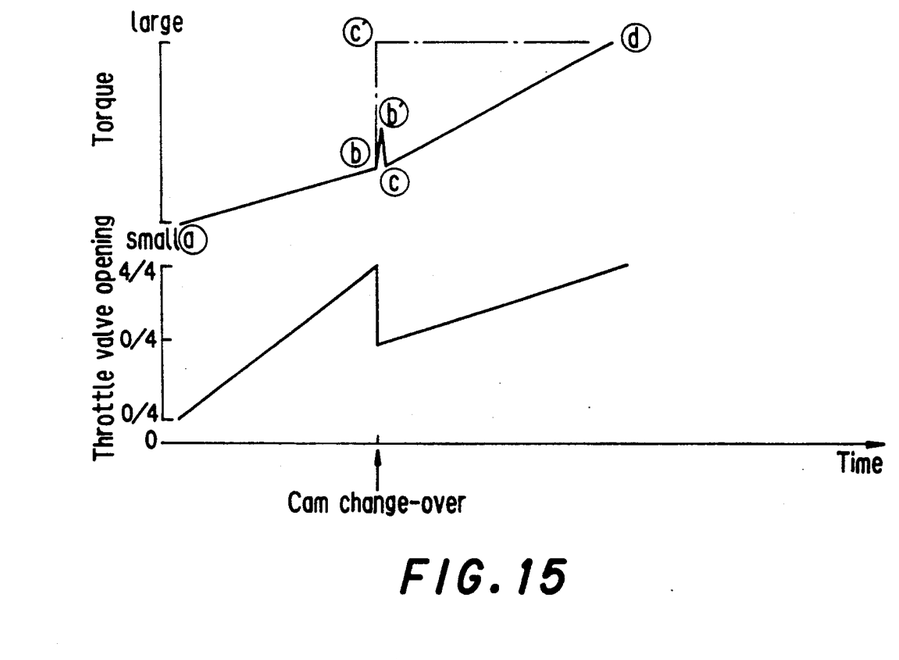
FIG. 15 is a wave pattern for the purpose of describing the relation between the variation of throttle opening and torque generated when a cam change-over is made according to this invention.

This control is however insufficient to avoid the torque change shown by the process b-b'-c in the figure. This is due to the fact that immediately after decreasing the throttle opening, the negative pressure in the air intake passage 58 downstream of the throttle valve 57 is still the same as before the throttle opening was changed. Residual air (fuel-air mixture) at this passage 58 is then aspirated into a cylinder according to the valve operating characteristics corresponding to the next cam selected, i.e. the second cam (low speed power cam) 22. As a result, the charging efficiency temporarily increases, and the torque generated temporarily increases.

To prevent the occurrence of such an engine torque peak, the torque generated is reduced by further decreasing the opening of the throttle valve 57 beyond the aforesaid target throttle opening angle $TVO_1$.

Figure 12:
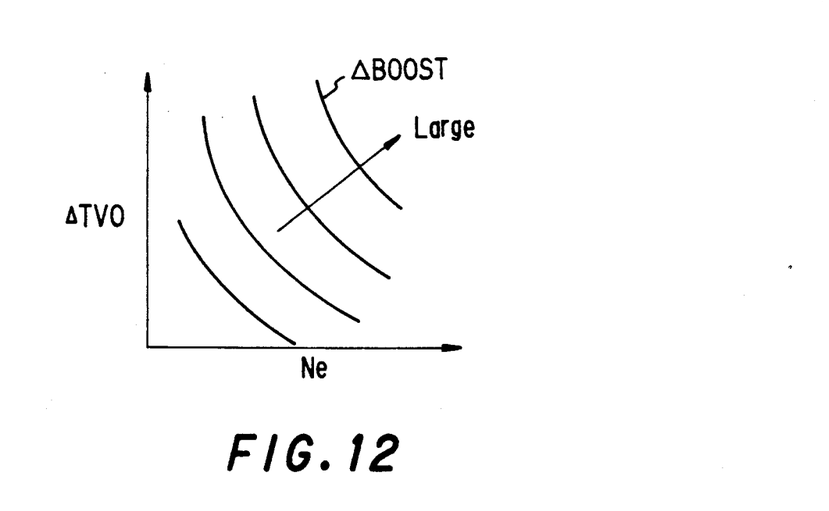
FIG. 12 is a graph showing the variation of negative intake pressure based on the difference of throttle valve opening and engine speed when a cam change-over is made according to this invention.
Figure 13:
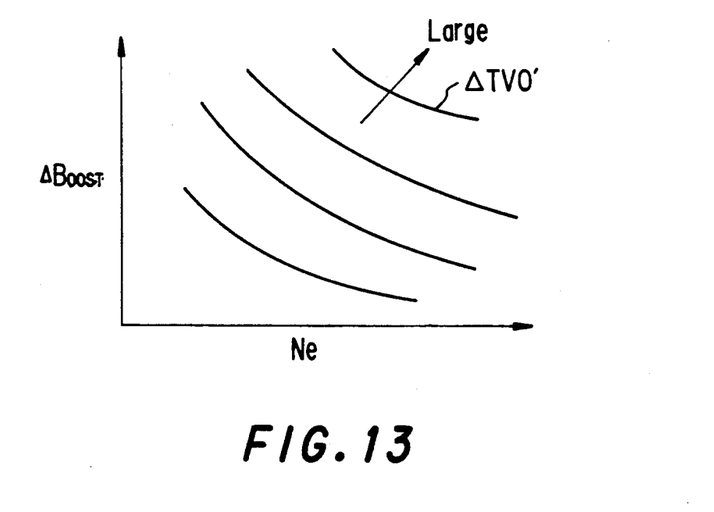
FIG. 13 is a graph showing the throttle overshoot amount based on the intake load pressure and engine speed when a cam change-over is made according to this invention.

To correct the throttle opening, in a step 16, a variation amplitude $\Delta BOOST$ of negative intake pressure during the response delay time when the opening of the throttle valve 57 is decreased to the target opening after cam change-over, is found based on the engine speed Ne and the aforesaid difference $\Delta TVO$ of throttle opening by referring to the map of FIG. 12. A supplementary amount by which the throttle valve 57 should be closed during cam change-over, i.e. an overshoot amount $\Delta TVO'$, is then computed based on this $\Delta BOOST$ and engine speed Ne by referring to the map of FIG. 13 (step 17).

Further, in a step 18, a throttle valve opening surface area A is found from:

$$A = A_0\{1 - \cos(TVO_0 - \Delta TVO - \Delta TVO')\} \quad (1)$$

where $A_0$ is the throttle opening surface area on full throttle.

Using this throttle opening surface area A and the engine speed Ne, a time constant $\tau$ which determines the response delay of the air aspirated into the cylinder is computed in steps 18 and 19 from:

$$\tau = Vc / (C_1 \cdot A + C_2 \cdot VH \cdot Ne \cdot \eta) \quad (2)$$

where Vc is the capacity of a collector 61 downstream of the throttle valve 57, VH is the engine exhaust amount, $C_1$ and $C_2$ are constants, and $\eta$ is the cylinder air charging efficiency.

Next, in a step 20, the throttle valve 57 is closed by the overshoot $\Delta TVO'$ in addition to the aforesaid throttle opening difference $\Delta TVO$ immediately after the cam change-over.

After this overshooting, the opening of the throttle valve 57 is increased to the target opening $TVO_1$ at a rate depending on the aforesaid time constant $\tau$ during a predetermined fixed time $t_0$ looked up in step 13 (step 22). This is due to the fact that if the overshoot were left unchanged, the throttle opening would be too small and it would not be possible to maintain the same torque as before the cam change-over.

Figure 16:
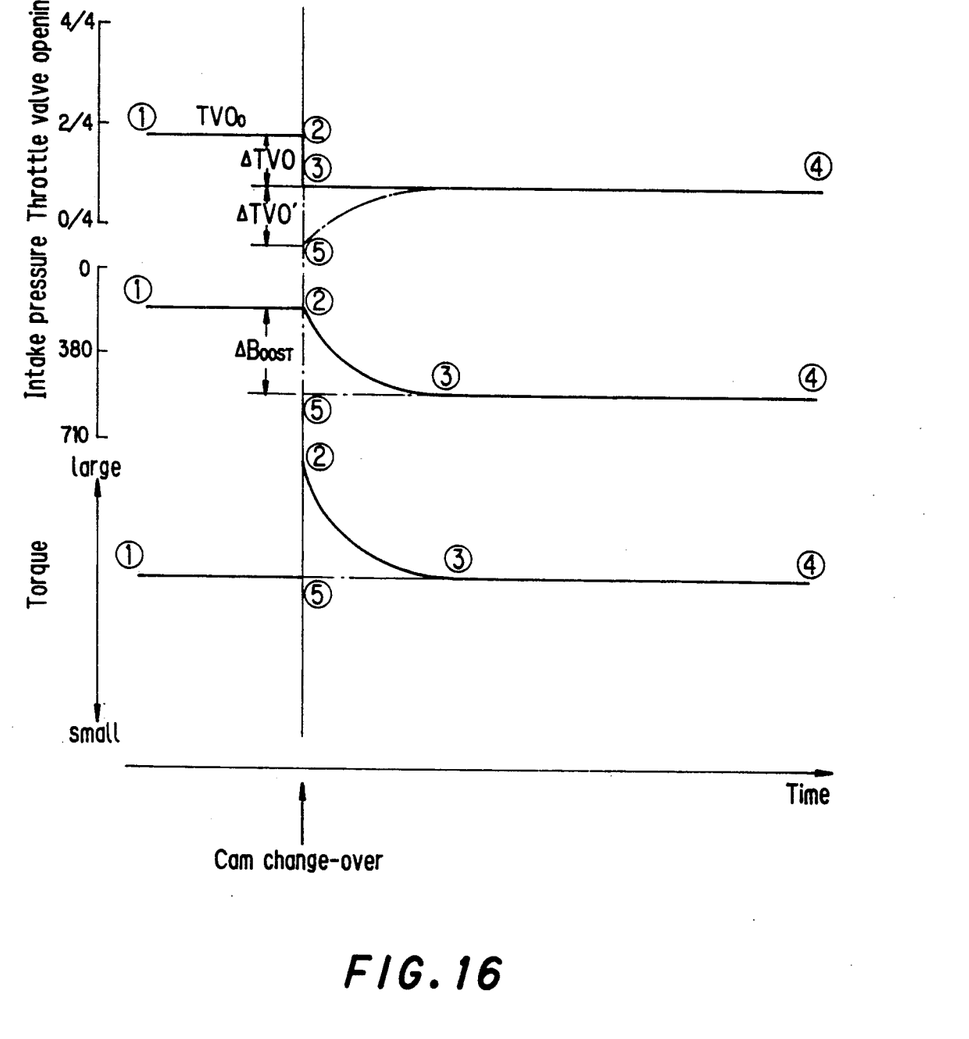
FIG. 16 is a wave pattern for the purpose of describing the relation between the throttle opening, negative intake pressure and torque generated when a cam change-over is made according to this invention.

FIG. 16 shows how the throttle opening varies, and how the negative intake pressure and torque generated vary, during cam change-over.

By adding an overshoot amount $\Delta TVO'$ to the difference of throttle opening $\Delta TVO$ between the current throttle opening and the target opening of the throttle valve 57 when a change-over is made from the first cam 21 to the second cam 22, the negative intake pressure decreases as shown by the broken line. Subsequently, the throttle valve 57 is gradually opened to the target opening, and the torque generated takes continuous values without passing through a peak as shown by the broken line.

It is thus possible to control torque variations during cam change-over, and a smooth driving performance can be obtained from the variable cam engine.

The solid line shows the case when the throttle opening is not given an overshoot during cam change-over. It is seen that due to the response delay of intake load pressure when the throttle opening is changed, a torque peak is produced.

In this embodiment, the case has been described where the throttle opening is controlled when a change-over is made from the first cam 21 to the second cam 22, but a torque shock when a change-over is made from the first cam 21 to the third cam 23 can also be prevented in the same way by temporarily giving the throttle opening an overshoot in a decreasing direction.

Figure 10:
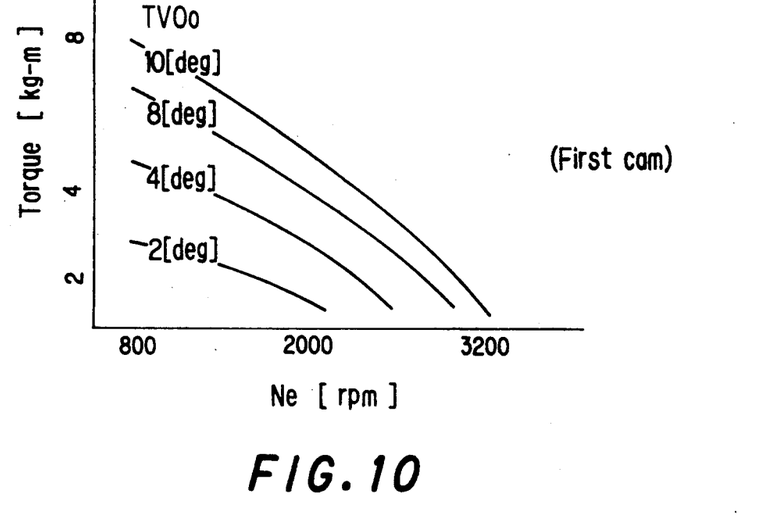
FIG. 10 is a graph showing the relation between the torque generated and engine speed relative to the throttle opening when the engine is running with the first cam according to this invention.
Figure 11:
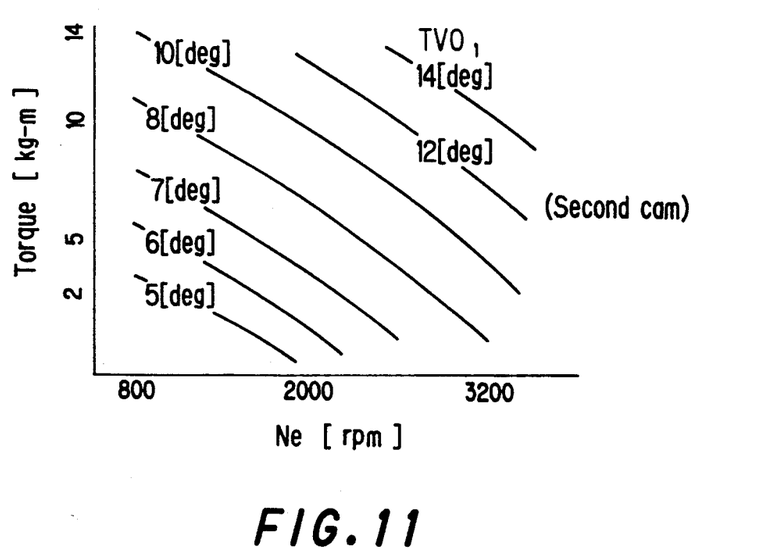
FIG. 11 is a graph showing the relation between the torque generated and engine speed relative to the throttle opening when the engine is running with the second cam according to this invention.

Conversely, when a change-over is made from the second cam 22 or the third cam 23, which are power cams that generate a large torque, to the first cam 21, which is an economy cam that generates a small torque, the opening of the throttle valve 57 is increased to maintain the same torque before and after the cam change-over (see maps in FIGS. 10, 11).

In this case, the torque temporarily decreases during the cam change-over, so the opening of the throttle valve 57 is given an overshoot in an increasing direction to correct this.

The computation of the overshoot amount or the computation of the time constant by which the throttle valve 57 returns to the target opening after the overshoot, is carried out in the same way based on the aforesaid steps 15–20.

The foregoing description of a preferred embodiment for the purpose of illustrating this invention is not to be considered as limiting or restricting the invention, since many modifications, including application of this invention to exhaust valves, may be made by those skilled in the art without departing from the scope of the invention.

The embodiments of this invention in which an exclusive property or privilege is claimed are defined as follows:

1. A variable cam engine including an economy cam having a profile which gives good fuel cost performance, a power cam having a profile which gives a large torque, means to select these cams according to the engine running conditions, and a mechanism to change over these cams such that the selected cam drives a valve of the engine, comprising:
   means for detecting the accelerator depression of the engine,
   a throttle valve provided in the engine air intake passage,
   means for controlling the opening of said throttle valve such that a torque is generated according to said accelerator depression,
   means for detecting said throttle valve opening,
   means for computing a throttle valve target opening after a cam change-over such that the torque computed based on said throttle valve opening before the cam change-over is the same as the torque generated after the change-over,
   means for computing an overshoot amount of said throttle valve from at least the engine speed and the difference of throttle valve opening before and after said change-over,
   means for causing said throttle valve opening to overshoot by the computed amount compared to said target opening when a cam change-over is made,
   means for computing a throttle valve return time constant based on at least the engine speed and the throttle valve opening immediately following said change-over, and
   means for returning the throttle valve opening to said throttle valve target opening after said overshoot at a rate depending on said time constant.

2. A variable cam engine as defined in claim 1, wherein said throttle valve is driven by a servomotor.

3. A variable cam engine as defined in claim 1, wherein said overshoot means causes said throttle valve opening to overshoot in the direction of decreasing throttle opening compared to said throttle target opening when a change-over is made from said economy cam to said power cam.

4. A variable cam engine as defined in claim 1, wherein said overshoot means causes said throttle valve opening to overshoot in the direction of increasing throttle opening compared to said throttle target opening when a change-over is made from said power cam to said economy cam.

5. A variable cam engine including an economy cam having a profile which gives good fuel cost performance, a power cam having a profile which gives a large torque, means to select these cams according to the engine running conditions, and a mechanism to change over these cams such that the selected cam drives a valve of the engine, comprising:

means for detecting the accelerator depression of the engine, a throttle valve provided in the engine air intake passage, means for controlling the opening of said throttle valve such that a torque is generated according to said accelerator depression, means for detecting said throttle valve opening, means for computing a throttle valve target opening after a cam change-over such that the torque computed based on said throttle valve opening before the cam change-over is the same as the torque generated after the change-over, means for computing a response delay of negative intake pressure from at least the engine speed and the difference of throttle opening before and after said cam change-over, means for computing an overshoot amount from this response delay of negative intake pressure and the engine speed, means for causing said throttle opening to overshoot by said computed amount compared to said target opening when a cam change-over is made, means for computing a throttle valve time return constant based on at least said engine speed and said throttle opening immediately following said change-over, and corresponding to the collector volume downstream of said throttle valve, and means to return the throttle valve opening to said throttle valve target opening after said overshoot at a rate depending on said time constant.

* * * * *